US011234042B2

(12) United States Patent
Kim et al.

(10) Patent No.: US 11,234,042 B2
(45) Date of Patent: Jan. 25, 2022

(54) DISPLAY DEVICE, CONTROL METHOD THEREFOR AND RECORDING MEDIUM

(71) Applicant: SAMSUNG ELECTRONICS CO., LTD., Suwon-si (KR)

(72) Inventors: Dong Hyun Kim, Suwon-si (KR); Byung Seok Min, Suwon-si (KR); Ho Cheon Wey, Suwon-si (KR); Beom Joon Kim, Suwon-si (KR); Jong Hwan Kim, Suwon-si (KR); Do Won Heo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/760,328

(22) PCT Filed: Nov. 12, 2018

(86) PCT No.: PCT/KR2018/013701
§ 371 (c)(1),
(2) Date: Apr. 29, 2020

(87) PCT Pub. No.: WO2019/098619
PCT Pub. Date: May 23, 2019

(65) Prior Publication Data
US 2020/0267440 A1 Aug. 20, 2020

(30) Foreign Application Priority Data

Nov. 14, 2017 (KR) .................... 10-2017-0151403

(51) Int. Cl.
H04N 21/431 (2011.01)
H04N 21/434 (2011.01)
(Continued)

(52) U.S. Cl.
CPC ....... *H04N 21/431* (2013.01); *H04N 5/23293* (2013.01); *H04N 9/64* (2013.01); *H04N 21/434* (2013.01)

(58) Field of Classification Search
CPC .... H04N 21/431; H04N 5/23293; H04N 9/64; H04N 21/434; H04N 21/4318; H04N 21/435; H04N 21/4516; H04N 21/4402
See application file for complete search history.

(56) References Cited

U.S. PATENT DOCUMENTS 9,443,495 B2    9/2016  Newton et al.
2012/0314945 A1  12/2012  Cha et al.
(Continued)

FOREIGN PATENT DOCUMENTS

CN    102819824 A    12/2012
CN    104754274 A    7/2015
(Continued)

OTHER PUBLICATIONS

International Search Report dated Mar. 8, 2019 by the International Searching Authority in counterpart International Patent Application No. PCT/KR2018013701. (PCT/ISA/210).
(Continued)

*Primary Examiner* — Alazar Tilahun
(74) *Attorney, Agent, or Firm* — Sughrue Mion, PLLC

(57) ABSTRACT

A display apparatus includes: a display; a receiver configured to receive data of main content from a content provider; and a processor configured to control the receiver to receive image data and reference information about whether sub content is involved along with main content in the image data, control the display to display an image of the main content and the sub content selectively involved in the main content based on the image data received in the receiver, and make the image be displayed by one image process selected
(Continued)

corresponding to whether the sub content is involved in the image based on the reference information among a plurality of image processes.

16 Claims, 12 Drawing Sheets

(51) Int. Cl.
*H04N 9/64* (2006.01)
*H04N 5/232* (2006.01)

(56) References Cited

U.S. PATENT DOCUMENTS

| | | |
|---|---|---|
| 2014/0026646 A1 | 1/2014 | Feldman et al. |
| 2014/0125696 A1 | 5/2014 | Newton et al. |
| 2014/0152686 A1 | 6/2014 | Narasimha et al. |
| 2015/0189221 A1 | 7/2015 | Nakase |
| 2017/0026646 A1* | 1/2017 | Minoo ................. H04N 19/182 |
| 2018/0278985 A1 | 9/2018 | De Haan et al. |

FOREIGN PATENT DOCUMENTS

| | | |
|---|---|---|
| CN | 106056550 A | 10/2016 |
| CN | 107113470 A | 8/2017 |
| EP | 2953092 A1 | 12/2015 |
| EP | 3214841 A1 | 9/2017 |
| EP | 3644618 A1 | 4/2020 |
| JP | 2007-140483 A | 6/2007 |
| KR | 10-2016-0090583 A | 8/2016 |
| KR | 10-2016-0140375 A | 12/2016 |
| KR | 10-2017-0052364 A | 5/2017 |
| KR | 10-2017-0097375 A | 8/2017 |
| WO | 2014/130213 A1 | 8/2014 |
| WO | 2016074999 A1 | 5/2016 |
| WO | WO-2016074999 A1 * | 5/2016 ....... H04N 21/42653 |

OTHER PUBLICATIONS

Written Opinion (PCT/ISA/237) dated Mar. 8, 2019 by the International Searching Authority in counterpart International Patent Application No. PCT/KR2018013701. (PCT/ISA/237).
Communication (JP OA) dated Nov. 12, 2019 by the Japanese Patent Office in counterpart Japanese Patent Application No. 2019-515440.
Communication dated May 12, 2020, from the Japanese Patent Office in counterpart application No. 2019-515440.
Communication dated Jul. 24, 2020, from the European Patent Office in counterpart European Application No. 18879123.0.
Communication dated Dec. 22, 2020, issued by the State Intellectual Property Office of P.R. China English in counterpart Chinese Application No. 201880004661.8.
Communication dated Aug. 19, 2021 issued by the Intellectual Property Office of the P.R.China in application No. 201880004661.8.
Communication dated Jun. 9, 2021 issued by the European Patent Office in application No. 18879123.0.

* cited by examiner

DISPLAY DEVICE, CONTROL METHOD THEREFOR AND RECORDING MEDIUM

TECHNICAL FIELD

The disclosure relates to a display apparatus for processing input content to display an image, a method thereof and a recording medium, and more particularly to a display apparatus, a method thereof, and a recording media, in which an image of content having a high resolution and high image-quality is displayed taking a user's visibility into account.

BACKGROUND ART

A display apparatus collectively refers to an apparatus that processes a signal or data of content according to an image processing process and displays a content image on a screen of its own display panel. As an example of the display apparatus in common home, there is a TV. Content provided to the display apparatus is transmitted from an optical disc player or the like content player or a set-top box or the like relay apparatus to the display apparatus according to a high definition multimedia interface (HDMI) or the like standards.

With development of technology, performance of an imaging device such as a camera, etc. has advanced, and image information included in the content in units of a frame has increased rapidly. This means that content provided from the content player to the display apparatus has a very high resolution and a very high definition. For example, the content may be content of a high brightness image such as a high dynamic range (HDR) image. However, when the display apparatus displays HDR content, the highest brightness supported in the display apparatus may be lower than the highest brightness of the content, or the brightness range representable in the display apparatus may be narrower than the brightness range of the content. To display such HDR content, the display apparatus employs a tone mapping (TM) technique.

The TM technique refers to a method of generating and displaying an output image by mapping brightness values of content, i.e. an input image to values within the brightness range representable by the display apparatus. For example, the image information of the content may have a brightness range of 0 to 2000 nit, but the brightness range representable by the display apparatus may be from 0 to 500 nit. When the output image is generated without changing the brightness value of the content, the display apparatus cannot represent a brightness value higher than 500 nit. Therefore, the display apparatus performs TM to convert an input image having a brightness range corresponding to the HDR content into an output image having a brightness range representable by the display apparatus.

The TM technique includes a static tone mapping (STM) technique and a dynamic tone mapping (DTM) technique. In the STM technique, the TM is varied depending on the attribute of the display apparatus, and therefore the identical display apparatus applies the same TM regardless of the kind of content. In the DTM technique, the TM is varied depending on a scene in content. Typically, the DTM technique reflects a content creator's intention better than the STM technique.

However, data transmitted from the content player to the display apparatus may not be only the content. For example, a user interface (UI) generated in the content player separately from content may be combined to the content. In this case, conventionally applying the TM technique to the content and UI to be displayed may make a user feel a sense of inconvenience or incompatibility in viewing the content and the UI.

DISCLOSURE

Technical Solution

The foregoing object of the disclosure is achieved by providing a display apparatus including: a display; a receiver configured to receive data of main content from a content provider; and a processor configured to control the receiver to receive image data and reference information about whether sub content is involved along with main content in the image data, control the display to display an image of the main content and the sub content selectively involved in the main content based on the image data received in the receiver, and make the image be displayed by one image process selected corresponding to whether the sub content is involved in the image based on the reference information among a plurality of image processes. Thus, the display apparatus minimizes change in image quality of the image when the main content is overlaid with the sub content in the image of which the main content is subjected to dynamic tone mapping (DTM).

The processor may control the image to be displayed with brightness information, which is obtained matching pixel information of the image data, by one selected among a plurality of settings according to whether the sub content is involved in the image.

The processor may perform the image process based on an attribute of the display apparatus when the sub content is involved in the image, and may perform the image process based on an attribute of the main content when the sub content is not involved in the image.

The processor may perform the image process based on the attribute of the main content by changing pixel information of the image data into brightness information of the image data in accordance with settings individually provided corresponding to scenes of the main content.

The processor may perform the image process based on the attribute of the display apparatus by changing pixel information of the image data into brightness information of the image data in accordance with a supportable brightness range of the display apparatus.

The processor may obtain the reference information from meta data that the content provider outputs.

It may be determined that the sub content is involved in the image when an area ratio of the sub content to the image is greater than a threshold, and it may be determined that the sub content is not involved in the image when the area ratio of the sub content to the image is not greater than the threshold.

The processor may perform a first image process based on an attribute of the display apparatus among the plurality of image processes when the image involves the sub content, and may maintain the first image process from a point in time when from a point in time when the image does not involve the sub content to a point in time when the scene of the main content is changed, and may perform a second image process based on an attribute of the main content among the plurality of image processes from the scene changing point in time.

The processor may adjust an applying rate of a first image process and a second image process step by step as time elapses, when the first image process is switched over to the second image process among the plurality of image processes.

The processor may perform the image processes different according to an area where the sub content is displayed and an area where the sub content is not displayed within the image.

The foregoing object of the disclosure is achieved by providing a method of controlling a display apparatus, including: receiving image data and reference information about whether sub content is involved along with main content in the image data from a content provider; selecting one image process corresponding to whether the sub content is involved in the image based on the reference information among a plurality of image processes; and displaying an image of the main content and the sub content selectively involved in the main content by the selected image process.

Further, the method may further include displaying the image with brightness information, which is obtained matching pixel information of the image data, by one selected among a plurality of settings according to whether the sub content is involved in the image.

Further, the method may further include: performing the image process based on an attribute of the display apparatus when the sub content is involved in the image; and performing the image process based on an attribute of the main content when the sub content is not involved in the image.

Further, the method may further include performing the image process based on the attribute of the main content by changing pixel information of the image data into brightness information of the image data in accordance with settings individually provided corresponding to scenes of the main content.

Further, the method may further include the image process based on the attribute of the display apparatus by changing pixel information of the image data into brightness information of the image data in accordance with a supportable brightness range of the display apparatus.

Further, the method may further include obtaining the reference information from meta data that the content provider outputs.

Further, the method may further include determining that the sub content is involved in the image when an area ratio of the sub content to the image is greater than a threshold, and determining that the sub content is not involved in the image when the area ratio of the sub content to the image is not greater than the threshold.

Further, the method may further include performing a first image process based on an attribute of the display apparatus among the plurality of image processes when the image involves the sub content; and maintaining the first image process from a point in time when from a point in time when the image does not involve the sub content to a point in time when the scene of the main content is changed, and performing a second image process based on an attribute of the main content among the plurality of image processes from the scene changing point in time.

Further, the method may further include performing the image processes different according to an area where the sub content is displayed and an area where the sub content is not displayed within the image.

Further, a nonvolatile computer readable recording medium, in which a program corresponding to a method executable by a processor of a display apparatus according to an embodiment of the disclosure is recorded, the method comprising: receiving image data and reference information about whether sub content is involved along with main content in the image data from a content provider; selecting one image process corresponding to whether the sub content is involved in the image based on the reference information among a plurality of image processes; and displaying an image of the main content and the sub content selectively involved in the main content by the selected image process.

BEST MODE

Below, exemplary embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these embodiments may be discretionally selected and applied to realize the present inventive concept by a person having an ordinary skill in the art.

Figure 1:
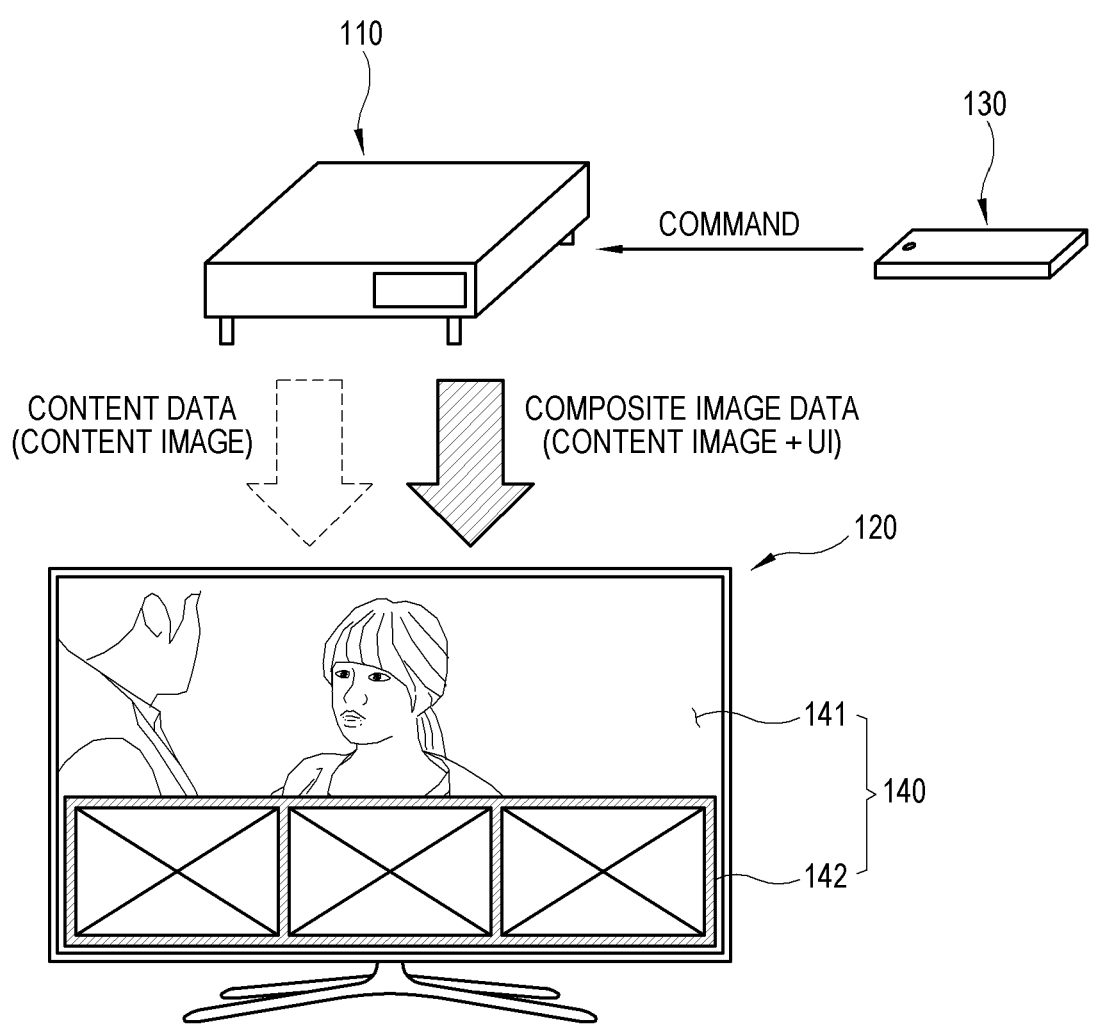
FIG. 1 illustrates an example that a display apparatus according to an embodiment of the disclosure displays a content image and a user interface (UI) based on data received from a content provider.

FIG. 1 illustrates an example that a display apparatus according to an embodiment of the disclosure displays a content image and a user interface (UI) based on data received from a content provider.

As shown in FIG. 1, a display apparatus 120 according to an embodiment of the disclosure is connected to a content provider 110, processes data output from the content provider 110, and displays an image based on the processed data. In other words, the content provider 110 serves as a source device, and the display apparatus 120 serves as a sink device. The content provider 110 and the display apparatus 120 may be connected by various wired/wireless standards. In this embodiment, high definition multimedia interface (HDMI) standards will be given by way of example, but various standards may be used.

The display apparatus 120 includes any apparatus capable of displaying an image, such as a TV, a monitor, etc. The content provider 110 includes any apparatus capable of reproducing or relaying content, such as a Blu-ray disc (BD), digital versatile disc (DVD), and the like optical disc player, a set-top box, a streaming apparatus, etc.

When the content provider 110 transmits a transition minimized differential signaling (TMDS) content signal generated by reproducing content to the display apparatus 120 through an HDMI cable, the display apparatus 120 processes the content signal according to an image processing process and displays a content image on a display. The image processing process may be varied depending on the formats of the content signal, and may for example include demultiplexing, decoding, descrambling, detail enhancement, scaling, etc.

The content is created taking the color gamut and the brightness of a predetermined reference monitor into account on the assumption that it will be basically displayed on the reference monitor. When content is created to correspond to a high dynamic range (HDR) image, the content has a wider brightness range and represents a more precise image than content of a low dynamic range (LDR).

However, when the highest brightness representable by the display apparatus 120 is lower than that of the reference monitor, the display apparatus 120 uses a tone mapping (TM) technique to convert an input image of HDR image content into an output image of LDR image content and displays the output image. The TM technique includes a static tone mapping (STM) technique based on the attribute of the display apparatus, and a dynamic tone mapping (DTM) technique based on the attribute of the content. The display apparatus 120 may use either of the STM or DTM technique to generate an output image.

The DTM technique performs TM suitable for a scene in content according changes of the scene, and thus makes a content image be displayed reflecting a content creator's intention better than the STM technique. In this regard, the display apparatus 120 displays a content image converted from content data by the DTM technique when receiving a signal including the content data from the content provider 110.

However, the display apparatus 120 may display not a content image 141 but a composite image 140 where the content image 141 is overlaid with a UI 142. For example, a user may control a remote controller 130 to transmit a command issued to display the UI 142 from the remote controller 130 to the content provider 110 while only the content image 141 is displayed in the display apparatus 120. The content provider 110 generates the UI 142 and outputs the data of the composite image 140, in which the content image 141 is overlaid with the UI 142, to the display apparatus 120, so that the display apparatus 120 can process the data of the composite image 140 and display the composite image 140.

When the DTM technique is applied to the composite image 140 like the case of displaying only the content image 141, a user may feel unnatural from the UI 142 since the TM is differently applied to the UI 142 according to the scenes as the scene of the content image 141 is changed. To solve this problem, an embodiment of the disclosure proposes the following method.

The display apparatus 120 displays the image 140 by one image process, which is determined according to whether sub content is included in an image of main content, among image processes such as an STM process and a DTM process. Here, the image 140 may include main content 141, and sub content 142 overlaid on the main content 141. The sub content refers to data of an appended image different from the content image 141, and may include the UI 142, an on-screen display (OSD), or another content different from the content of the main content 141.

Specifically, the display apparatus 120 determines whether the main content data of the main content 141 is output from the content image 141 or the sub content data of the sub content 142 is output as appended to the main content data, on the basis of preset reference information received from the content provider 110. The display apparatus 120 performs the DTM process based on the attribute of the content image 141 when it is determined that the main content data is output without the sub content data. On the other hand, the display apparatus 120 performs the STM process based on the attribute of the display apparatus 120 when it is determined that the sub content data is output as appended to the main content data. Details of the DTM process and the STM process will be described later.

Thus, when the content image 141 is displayed by the DTM process and the UI 142 is appended to the content image 141, the display apparatus 120 prevents the UI 142 from being changed in image quality even though the scene of the content image 141 is changed, thereby making a user feel natural from the UI 142.

Figure 2:
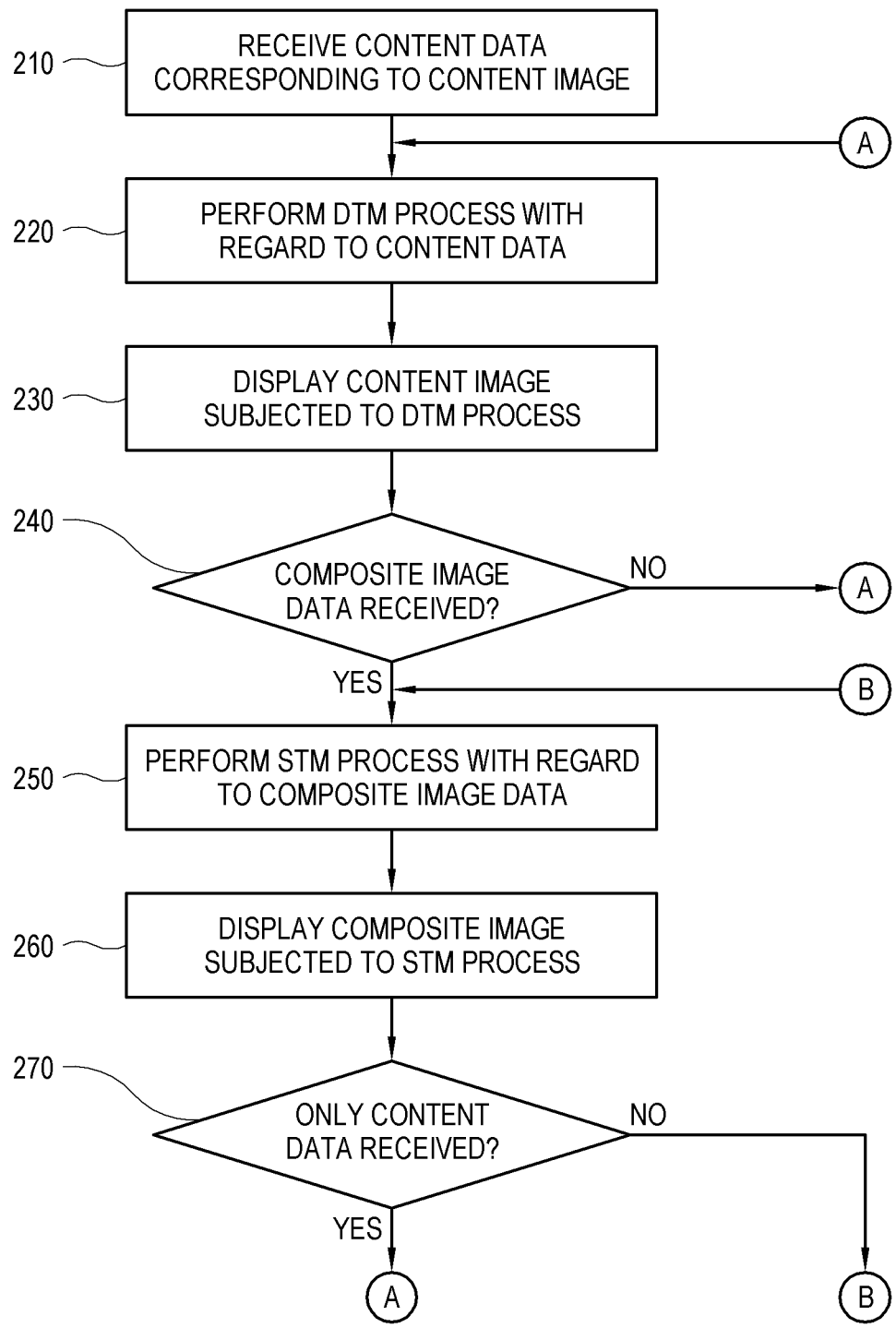
FIG. 2 is a flowchart showing a method of controlling a display apparatus according to an embodiment of the disclosure.

FIG. 2 is a flowchart showing a method of controlling a display apparatus according to an embodiment of the disclosure.

As shown in FIG. 2, the display apparatus operates as follows.

At operation 210 the display apparatus receives content data corresponding to a content image from the content player.

At operation 220 the display apparatus makes the received content data be subjected to the DTM process corresponding to the attribute of the content. For the DTM process, the display apparatus may receive DTM data, i.e. DTM settings from the content player. Alternatively, the display apparatus may generate the DTM settings based on meta data received from the content player. Details of the DTM settings based on the meta data will be described later.

At operation 230 the display apparatus displays content image subjected to the DTM process.

At operation 240 the display apparatus determines whether composite image data corresponding to a composite image, in which a content image is overlaid with an appended image, is received from the content player.

When it is determined that only the content data is received without the composite image data, the display apparatus returns to the operation 220 and continues to perform the DTM process with regard to the content data received from the content player.

On the other hand, when it is determined that the composite image data is received, at operation 250 the display apparatus performs the STM process, which corresponds to the attribute of the display apparatus, with regard to the composite image data.

At operation 260 the display apparatus displays the composite image subjected to the STM process.

At operation 270 the display apparatus determines whether the composite image data is not received any more only the content data is received from the content player.

When it is determined that the composite image data is continuously received, the display apparatus returns to the operation 250 and continues to perform the STM process with regard to the composite image data.

On the other hand, when it is determined that the reception of the composite image data is switched over to only the content data, the display apparatus returns to the operation 220 and performs the DTM process with regard to the content data received from the content player.

Below, the STM process and the DTM process will be described in more detail.

The STM process refers to a method of performing the TM based on the attribute of the display apparatus that displays an image. Here, the attribute of the display apparatus may for example include the color gamut, the highest brightness, the brightness range or the like representable by the display apparatus. When the brightness range of the display apparatus is taken into account, the TM may be performed based on a table where brightness values of an output image are tabulated matching pixel values, gray scale values or brightness values of an input image, and one table may be represented as one two-dimensional curve. In other words, the TM curve is represented on a plane of which abscissas indicate the pixel values, the gray scale values or the brightness values of an input image and ordinates indicate the brightness value of an output image. The range of the ordinates is determined according to the display apparatus.

That the TM is performed based on the attribute of the display apparatus means that only one TM table or one TM curve is used. In other words, the STM process may be performed using various TM curves different according to the display apparatuses, but one TM curve is applied to one display apparatus irrespective of content.

The DTM process refers to a method of performing the TM based on the attribute of a content image. Here, the attribute of the content image is given in units of a scene of the content, and the DTM process provides different TV curves in units of the scene of the content. The display apparatus applies a TM curve matching the current scene of the content to the image frame of the current scene, and applies another TM curve matching a different scene to the image frame of the different scene when the current scene is changed to the different scene. In other words, the DTM process applies TM curves different according to scenes within a content image displayed in one display apparatus.

When the content player outputs only the content data corresponding to the content image, the display apparatus may apply the DTM process to the content data to display the content image. In this case, the content image may be displayed more accurately reflecting the content provider's intention by the DTM process rather than the STM process.

Below, visibility about an image, which a user feels when an embodiment of the disclosure is reflected, will be described.

Figure 3:
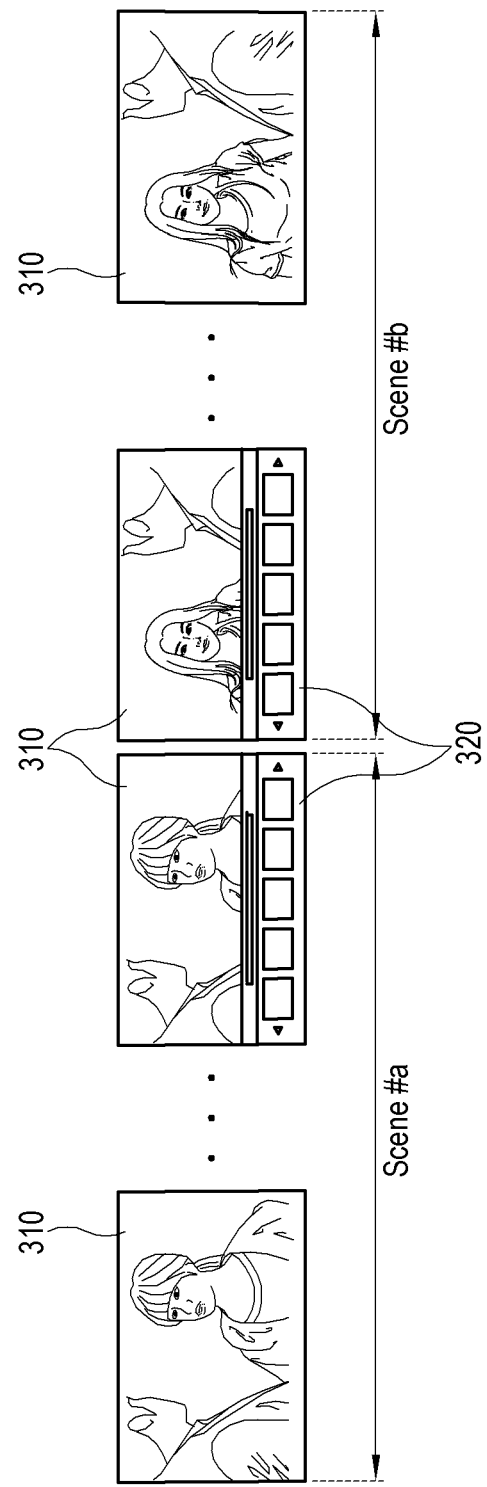
FIG. 3 illustrates an example that some of image frames of an image displayed on a display apparatus according to an embodiment of the disclosure are arrayed in chronological order.

FIG. 3 illustrates an example that some of image frames of an image displayed on a display apparatus according to an embodiment of the disclosure are arrayed in chronological order.

As shown in FIG. 3, a content image 310 includes a plurality of image frames to be sequentially displayed in chronological order. The content image 310 includes one or more image frames in units of a scene, in which, when one scene is ended as time elapses, the scene is changed to the next scene. There are many methods of defining one scene within the content image 310 or distinguishing between two scenes. In general, information for distinguishing between scenes in units of an image frame may be recorded in meta data appended to the content image 310 by the content provider.

The reason why the DTM process is provided with a TM table or the like TM setting information individually in units of a scene of the content image 310 is as follows. For example, a scene # a is an image having a background as relatively dark as night, and the next scene # b is an image having a background as relatively bright as day.

When only the content image 310 is displayed without the UI 320 overlaid on the content image 310, the TM settings corresponding to the scene # a are applied to the image frame of the scene # a, and the TM settings corresponding to the scene # b are applied to the image frame of the scene # b. In other words, when change is made from the scene # a to the scene # b, the TM settings corresponding to the scene # a are switched over to the TM settings corresponding to the scene # b. Because the scene # a and the scene # b are different in the amount of light, TM has to be differently applied according to the scenes by taking contrast into account, thereby securing visibility of a user even though the scene is changed.

However, as shown in FIG. 3, the content image 310 may be overlaid with the UI 320 while the scene # a is displayed, and the UI 320 may be displayed on the content image 310 for a predetermined period of time after the scene # a is changed to the scene # b. In this case, when the TM settings individually matching the scenes are respectively applied to the image frames of the corresponding scenes, the TM applied to the UI 320 is varied. This is inconvenient for a user because the user recognizes as if the UI 320 is rapidly varied in image quality depending on the change in the scene of the content image 310.

Accordingly, the display apparatus according to an embodiment of the disclosure switches the TM settings for the image from the DTM settings for the scene # a to the STM settings, when it is sensed that the content image 310 is overlaid with the UI 320 while the scene # a of the content image 310 is displayed. Although the scene of the content image 310 is changed, the display apparatus maintains the STM settings while the UI 320 is continuously displayed. When it is sensed that the UI 320 is not displayed any more, the display apparatus switches over to the DTM settings for the current scene, or maintains the STM settings while the current scene is continued and then switches over to the DTM settings for the next scene at a point in time when the current scene is changed to the next scene.

Thus, the visibility of the UI 320 is secured while the UI 320 is displayed.

Below, the hardware configurations of the content provider and the display apparatus according to an embodiment of the disclosure will be described.

Figure 4:
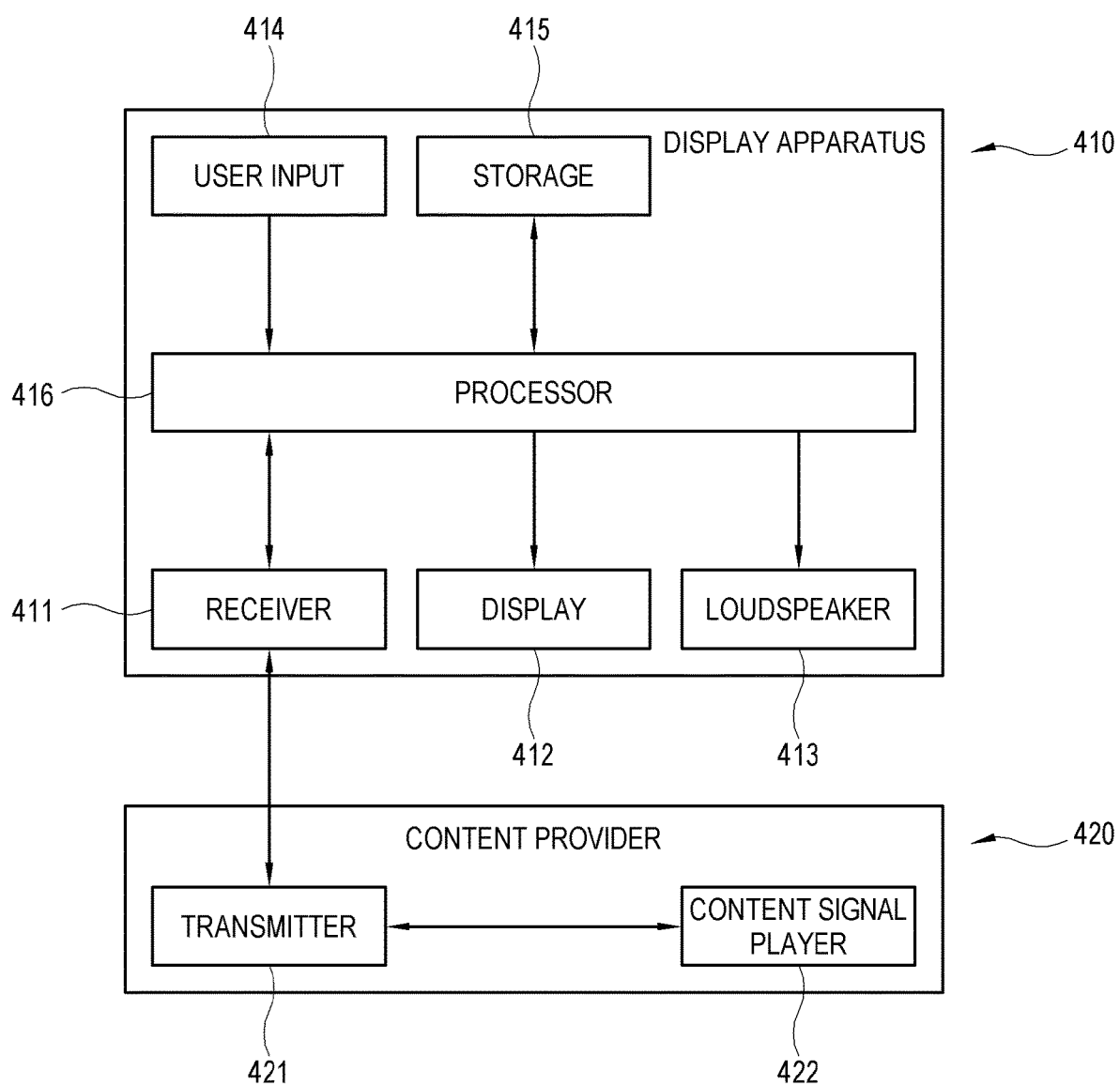
FIG. 4 is a block diagram of a content provider and a display apparatus according to an embodiment of the disclosure.

FIG. 4 is a block diagram of a content provider and a display apparatus according to an embodiment of the disclosure.

As shown in FIG. 4, a display apparatus 410 includes a receiver 411 to receive a content signal from a content provider 420, a display 412 to display an image, a loudspeaker 413 to output a sound, a user input 414 to allow a user to make an input, a storage 415 to store data, and a processor 416 to process the content signal and perform a process for operations of the display apparatus 410.

The content provider 420 includes a transmitter 421 to transmit a content signal to the display apparatus 410, and a content signal player 422 to reproduce the content signal and processes the reproduced content signal to be transmitted to the transmitter 421. The transmitter 421 includes a communication circuit provided corresponding to the receiver 411 and communicating with the receiver 411. The content signal player 422 is actualized by a typical hardware processor.

The receiver 411 is a communication circuit that includes a data input/output interface where communication modules or ports are combined corresponding to various communication protocols. The receiver 411 is basically provided to receive a content signal from the content provider 420, but is also interactively provided to transmit and receive a signal. The receiver 411 according to this embodiment is connected to the content provider 420 through a cable of HDMI, but such a connection method is not limited to the HDMI.

The display 412 includes a display panel to display an image on a screen thereof. The display panel is provided to have a light receiving structure such as a liquid crystal type, or a self-emissive structure such as an organic light emitting diode (OLED) type. The display 412 may include additional elements according to the structures of the display panel. For example, when the display panel is of the liquid crystal type, a backlight unit for emitting light to a liquid crystal display panel, a panel driving circuit for driving the liquid crystal of the liquid crystal display panel, etc. are added.

The loudspeaker 413 outputs a sound based on an audio signal. The loudspeaker 413 includes a unit loudspeaker provided corresponding to audio data of a certain audio channel, and may include a plurality of unit loudspeakers respectively corresponding to audio data of a plurality of audio channels.

The user input 414 transmits a preset control command or information to the processor 416 in response to a user's control or input. The user input 414 may be actualized in various forms according to methods of inputting information, and for example includes various user interface environments installed in the display apparatus 410, such as a key installed on an outer side of the display apparatus 410, a touch screen installed on the display 412, a microphone to which a user's speech is input, a camera to capture or sense a user's gesture or the like, a sensor, etc. Further, the user input 414 may include a remote controller physically separated from the display apparatus 410.

The storage 415 is accessed by the processor 416, and performs operations such as reading, recording, modifying, deleting, updating, etc. of data under control of the processor 416. The storage 415 includes a nonvolatile memory such as a flash memory, a hard-disk drive, a solid-state drive, etc. in which data is retained regardless of whether the display apparatus 410 is powered on or off, and a volatile memory such as a buffer, a random-access memory (RAM), etc. to which data for a process is loaded.

The processor 416 processes a content signal received in the receiver 411 so that a content image can be displayed on the display 412. The processor 416 extracts image data from the content signal, decodes the image data, applies TM to the image data, and outputs the image data to the display 412. The processor 416 includes a hardware processor actualized by a central processing unit (CPU), a chipset, a buffer, a circuit, etc. mounted to a printed circuit board, and may be designed by a system on chip (SoC). The processor 416 includes modules corresponding to various processes, such as a demultiplexer, a decoder, a scaler, an audio digital signal processor (DSP), an amplifier, etc., and some of them may be actualized as the SoC. For example, the modules related to image processes, such as the demultiplxer, the decoder, the scaler, etc. may be actualized as an image processing SOC, and the audio DSP may be actualized as a chipset separately from the SOC.

To realize the concept of the disclosure, various embodiments about operations of the display apparatus and the content provider will be described below.

Figure 5:
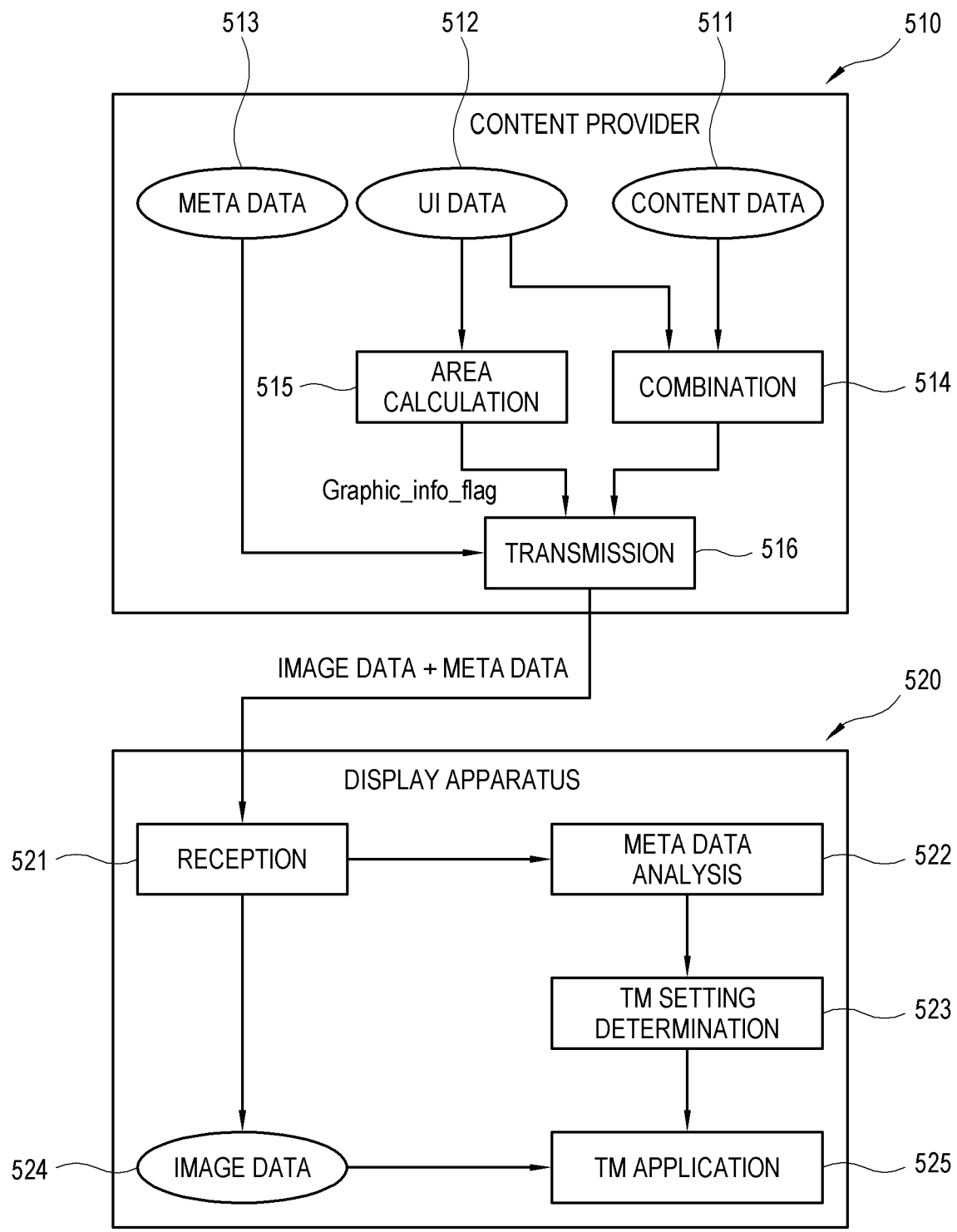
FIG. 5 is a block diagram showing an embodiment of data transmission and operation procedures of a content provider and a display apparatus of the disclosure.

FIG. 5 is a block diagram showing an embodiment of data transmission and operation procedures of a content provider and a display apparatus of the disclosure.

As shown in FIG. 5, when UI data 512 corresponding to a UI or the like graphic image is generated while content data 511 corresponding to a content image is reproduced, a content provider 510 combines the content data 511 and the UI data 512 so that the content image can be displayed being overlaid with the UI (514).

Meanwhile, the content provider 510 calculates the area of the UI with respect to the content image (515), and records a calculation result in a field of the meta data. For convenience, this field will be named 'Graphic_info_flag', but this name is merely an example. The content provider 510 sets Graphic_info_flag=0 when the area of the UI with respect to the content image is smaller than a predetermined threshold, and sets Graphic_info_flag=1 when the area of the UI with respect to the content image is larger than the threshold. For example, under the condition that the threshold is 2%, the content provider 510 sets Graphic_info_flag=0 when the area of the UI overlaid on the content image occupies 1% of the total area of the content image.

In other words, Graphic_info_flag=1 indicates that the content image is substantially overlaid with the UI, and Graphic_info_flag=0 indicates that only the content image is displayed without being overlaid with the UI or the UI overlaid on the content image is small enough to be ignorable.

The content provider 510 transmits image data where the content data 511 and the UI data 512 are combined, and meta data 513 to the display apparatus 520 (516). The value of Graphic_info_flag is recorded in the meta data 513 before the transmission.

The display apparatus 520 receives the image data and the meta data (521), and analyzes the meta data to identify the value of Graphic_info_flag (522). The display apparatus 520 selects either of the DTM or STM settings in response to the identified value of Graphic_info_flag (523). In terms of the TM settings, the display apparatus 520 selects the DTM settings based on the attributes of the content image designated in the meta data at Graphic_info_flag=0 and selects the STM settings based on the attributes of the display apparatus 520 at Graphic_info_flag=1.

The display apparatus 520 applies the TM to the image data 524 in accordance with the selected TM settings (525), thereby displaying an image.

Figure 6:
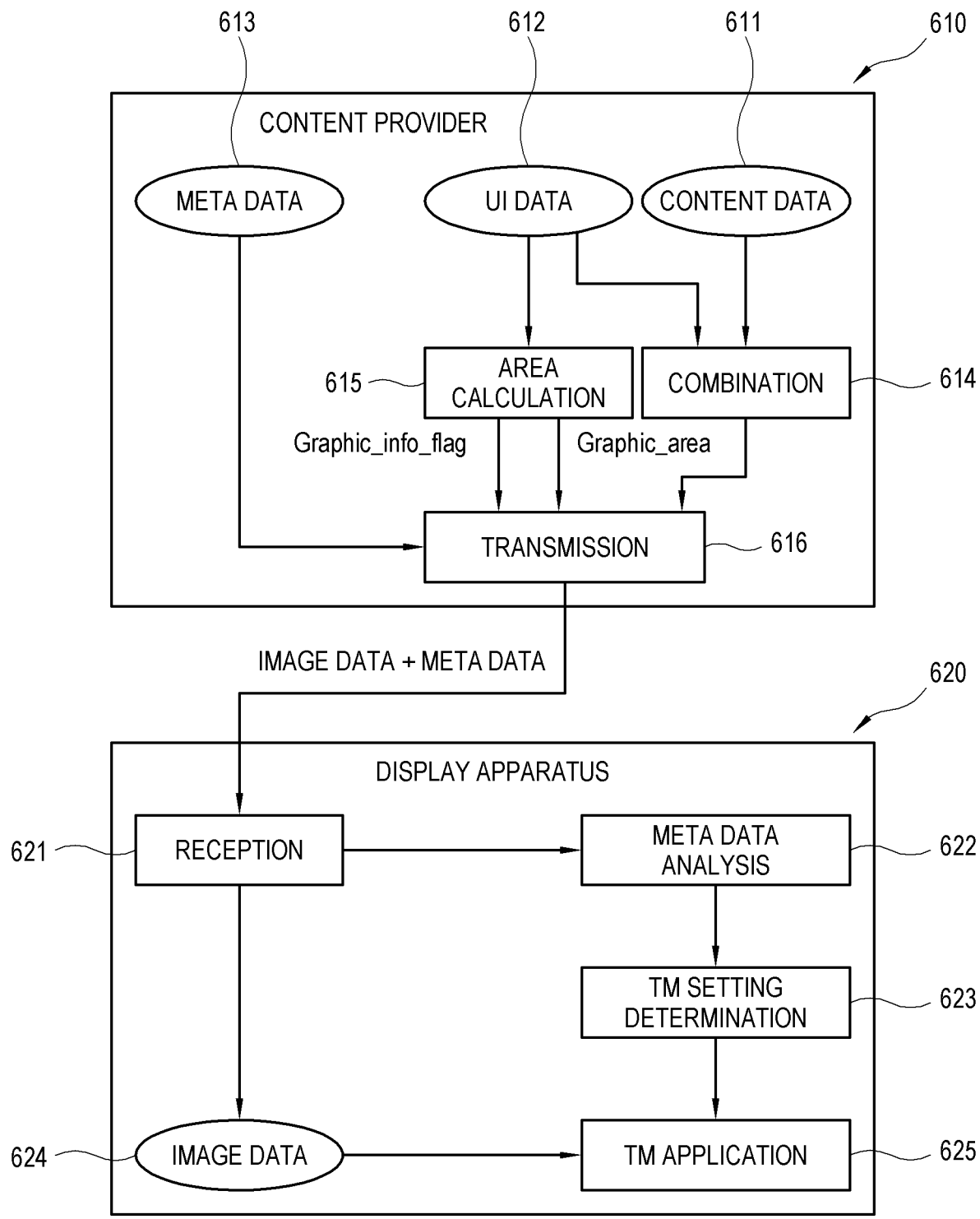
FIG. 6 is a block diagram showing another embodiment of data transmission and operation procedures of a content provider and a display apparatus of the disclosure.

FIG. 6 is a block diagram showing another embodiment of data transmission and operation procedures of a content provider and a display apparatus of the disclosure.

As shown in FIG. 6, when UI data 612 corresponding to a UI or the like graphic image is generated while content data 611 corresponding to a content image is reproduced, a content provider 610 combines the content data 611 and the UI data 612 so that the content image can be displayed being overlaid with the UI (614).

Meanwhile, the content provider 610 calculates the area of the UI with respect to the content image (615), and thus obtains values of 'Graphic_info_flag' and 'Graphic_area'. The content provider 610 sets Graphic_info_flag=1 when a UI image is generated, and records Graphic_area with a value of an area that the UI occupies the content image.

The content provider 610 transmits the image data where the content data 611 and the UI data 612 are combined, and the meta data 613 to the display apparatus 620 (616). The values of Graphic_info_flag and Graphic_area are recorded in the meta data 613 before the transmission.

The display apparatus 620 receives the image data and the meta data (621), and analyzes the meta data to identify the value of Graphic_info_flag and Graphic_area (622). The display apparatus 620 compares the value of Graphic_area with a predetermined threshold at Graphic_info_flag=1. When the value of Graphic_area is greater than the threshold, the STM is set based on the attribute of the display apparatus 620. When the value of Graphic_area is smaller than the threshold, the DTM is set based on the attribute of the content image designated in the meta data.

The display apparatus 620 applies the TM to the image data 624 in accordance with the selected TM settings (625), thereby displaying an image.

Difference between this embodiment and the foregoing embodiment of FIG. 5 is as follows. In the foregoing embodiment of FIG. 5, the content provider selects either of the DTM settings or the STM settings, and the display apparatus performs the TM based on the selection information of the content provider recorded in the meta data. On the other hand, the content provider 610 in this embodiment provides information about the generation of the UI and information about the area of the UI to the display apparatus 620, and the display apparatus 620 selects either of the DTM settings or the STM settings based on the information.

Figure 7:
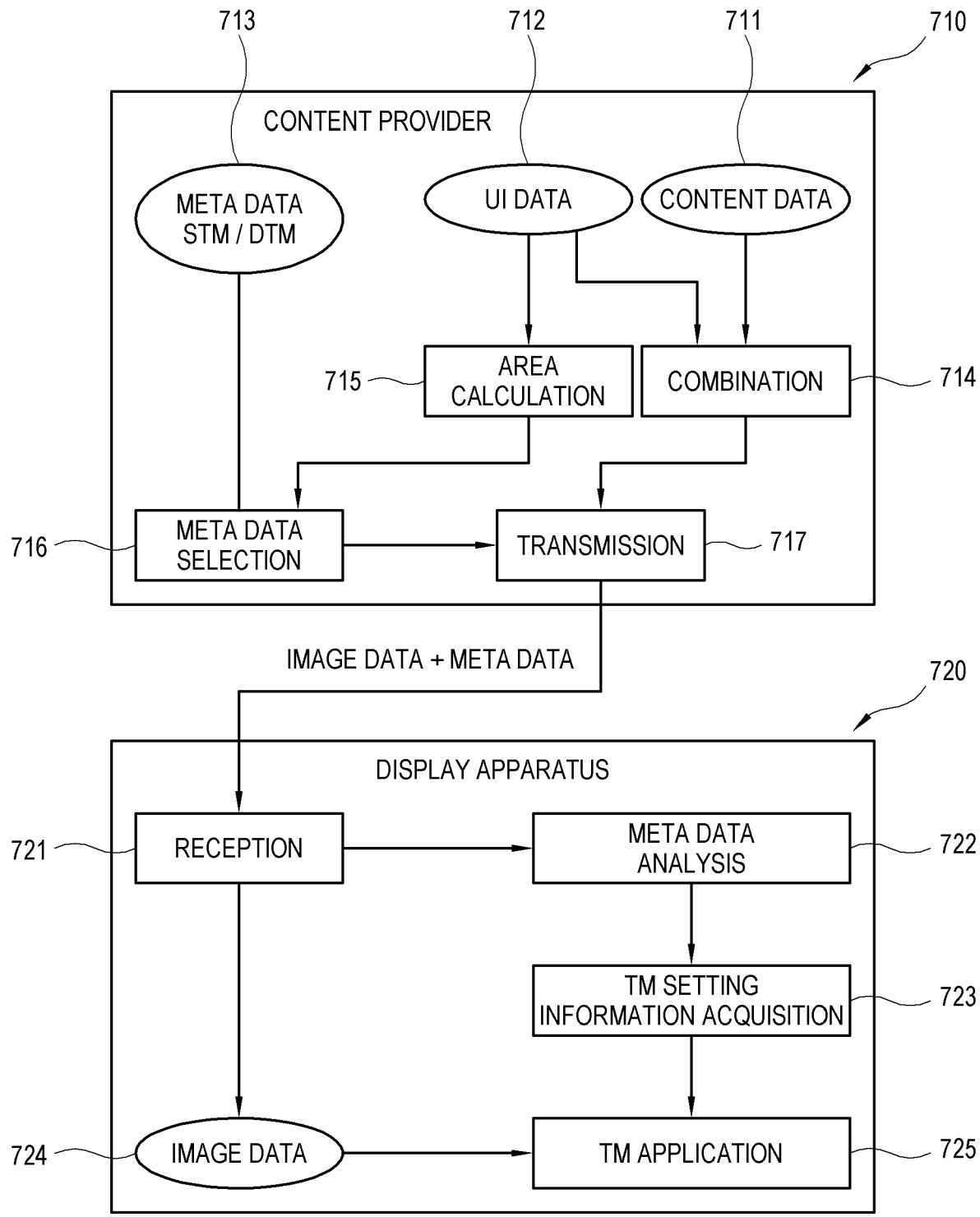
FIG. 7 is a block diagram showing another embodiment of data transmission and operation procedures of a content provider and a display apparatus of the disclosure.

FIG. 7 is a block diagram showing another embodiment of data transmission and operation procedures of a content provider and a display apparatus of the disclosure.

As shown in FIG. 7, a content provider 710 combines content data 711 and UI data 712 to generate image data. Meanwhile, the content provider 710 prepares STM meta data for STM and DTM meta data for DTM. The STM meta data includes TM setting information based on the attribute of a display apparatus 720, which is obtained from the display apparatus 720. The DTM meta data includes TM setting information based on the attribute of the content data 711.

The content provider 710 calculates the area of the UI with respect to the content image (715). The content provider 710 selects the STM meta data between the STM meta data and the DTM meta data when the calculated area is greater than a predetermined threshold, and selects the DTM meta data when the calculated area is smaller than the threshold (716).

The content provider 710 transmits the image data with the selected meta data to the display apparatus 720 (717). In other words, the content provider 710 in this embodiment selects either of STM or DTM, generates TM setting information based on the selected TM, and transmits the information to the display apparatus 720.

The display apparatus 720 receives the image data and the meta data from the content provider 710 (721). The display apparatus 720 analyzes the meta data (722), and obtains the TM setting information involved in the meta data (723). The display apparatus 720 applies the TM to the image data 724 in accordance with the obtained TM setting information (725).

Meanwhile, in the foregoing embodiment, when it is sensed that the UI 320 is not displayed any more on the content image, the display apparatus directly switches over to the DTM settings matching the current scene, or maintains the STM settings while the current scene is continued and then switches over to the DTM settings for the next scene at a point in time when the current scene is changed to the next scene. In this regard, detailed descriptions will be made below.

Figure 8:
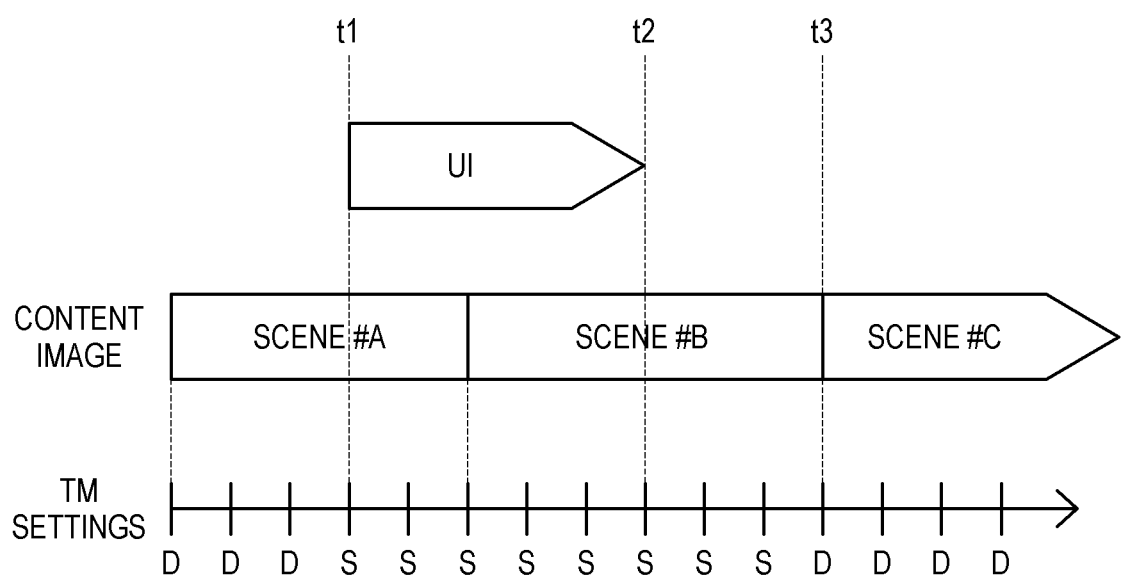
FIG. 8 illustrates an example of explaining a principle that a display apparatus according to an embodiment of the disclosure applies tone mapping (TM) settings to image frames corresponding to scenes in chronological order.

FIG. 8 illustrates an example of explaining a principle that a display apparatus according to an embodiment of the disclosure applies tone mapping (TM) settings to image frames corresponding to scenes in chronological order.

As shown in FIG. 8, the display apparatus sequentially displays scenes of a current image in chronological order, and each scene includes a plurality of image frames. The display apparatus applies either of DTM or STM to each image frame, thereby performing the TM.

While the display apparatus displays the scene # a of the content image, the content image is overlaid with the UI at a certain point in time t1. In this case, the display apparatus switches over from the DTM settings to the STM settings, and performs the TM based on the STM settings with regard to the composite image where the content image and the UI are combined. While the UI is displayed, the display apparatus maintains the STM settings and performs the TM with regard to the image frames of the scene even though the content image is changed from the scene # a to the scene # b.

However, when the display of the UI is terminated at a point in time t2 while the scene # b of the content image is displayed, the TM settings have to be changed from the STM settings to the DTM settings because only the content image is displayed thereafter. Here, it will be described below what point in time is preferable to change the TM settings.

For example, the display apparatus may switch over from the STM settings to the DTM settings matching the scene # b of the content image at the point in time t2. However, for a period of time from the point in time t2 to a point in time t3 when the change to the next scene # c is made, the scene # b of the content image is continuously displayed. In other words, when the TM settings are changed at the point in time t2, the STM settings are applied to the content image before the point in time t2, but the DTM settings are applied to the content image after the point in time t2. Therefore, a user feels as if the content image is rapidly changed in image quality with respect to the point in time t2.

As another example for minimizing such incompatibility a user may feel, the display apparatus does not switch the TM settings at the point in time t2 but maintains the STM settings even while the scene # b of the content image is displayed. Further, the display apparatus switches over from the STM settings to the DTM settings matching the scene # c of the content image when change to the scene # c is made in the content image at the point in time t3. Thus, the display apparatus may prevent a user who views the content image from feeling change in image quality within one scene.

Meanwhile, in the foregoing embodiments, the TM settings are immediately switched at a certain point in time. Although such a method is possible, the TM has a large effect on the image quality of the image, and therefore immediate switching of the TM settings may be inconvenient for a user because it looks for the user as if the image quality of the image is suddenly changed. Below, an embodiment for solving such a problem of inconvenience will be described.

Figure 9:
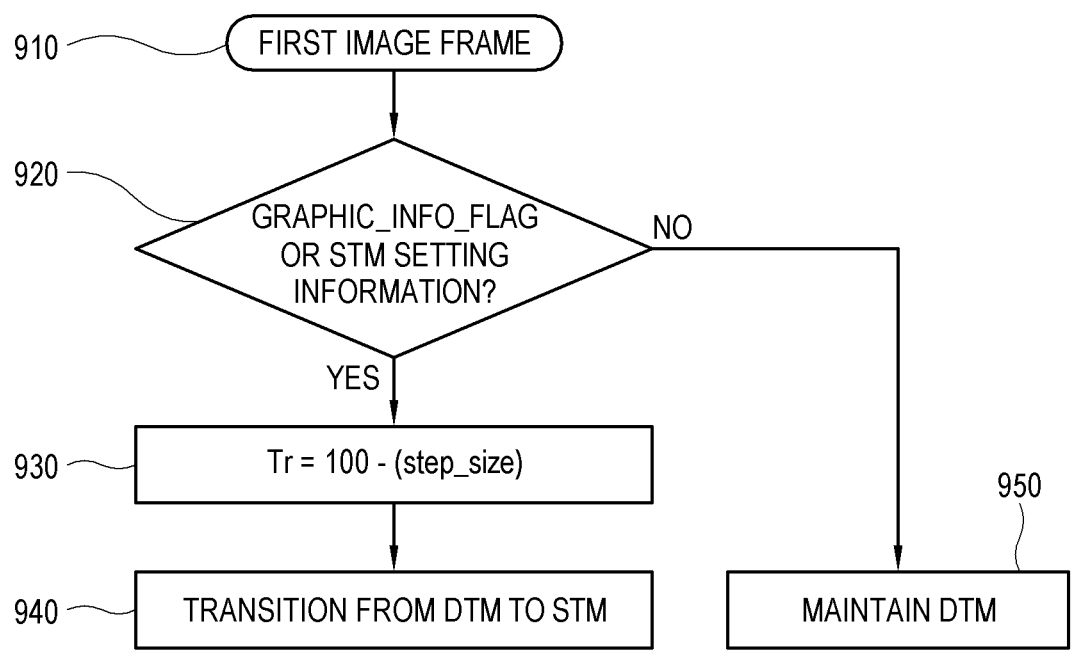
FIG. 9 is a flowchart showing operations of a display apparatus according to an embodiment of the disclosure in the first image frame during a procedure of switching the TM settings.

FIG. 9 is a flowchart showing operations of a display apparatus according to an embodiment of the disclosure in the first image frame during a procedure of switching the TM settings.

As shown in FIG. 9, the display apparatus operates as follows. When the TM settings are switched over from the DTM to the STM or from the STM to the DTM, an image-quality change period, i.e. a transition period may be given as much as a preset period of time to prevent the image from being suddenly changed in image quality. For example, for switching, i.e. transition of the TM settings from a predetermined DTM curve to a predetermined STM curve, the display apparatus adjusts an applying rate of the DTM curve and the STM curve step by step as time elapses, thereby restraining the sudden change in image quality.

Let the TM curve at a TM-transition start point in time be C1, and the TM curve at a TM-transition end point in time be C2. At a certain point in time between the transition start point and the transition end point, the TM curve Cc may be expressed by 'Cc=C1*Tr+C2(1−Tr)'. 'Tr' indicates a transition rate, a value of which ranges from 100 to 0. From Tr=100 at the transition start point in time, the TR decreases as much as a preset positive integer of 'step_size' per unit time as time elapses. At the transition end point in time, Tr=0. For example, when 3 seconds are given as a unit time, the Tr for 24-fps content has to be decreased step by step from 100 to 0 during 72 frames, and a corresponding value of step_size is previously set. The value of step_size is used as a factor for controlling the transition speed of the TR curve. The transition rate may be linearly set, or may be set as a preset sigmoid curve.

Detailed transition of the TM settings is as follows. At operation 910 the display apparatus checks the first image frame at the transition start point in time.

At operation 920 the display apparatus determines whether meta data recorded with Graphic_info_flag=1 or meta data recorded with STM setting information is received from the content provider. In other words, the display apparatus determines whether data of the content image combined with a UI or the like appended image is received.

When the meta data indicating the presence of the appended image is received, at operation 930 the display apparatus decreases the transition rate as much as step_size in response to progress of one unit time. In other words, Tr=100−(step_size).

At operation 940 the display apparatus transits the TM settings from the DTM to the STM as much as the decreased transition rate. As described above, the TM curve at the transition point in time may be expressed by Cc=C1*Tr+ C2(1−Tr). When C1 indicates the DTM curve and C2 indicates the STM curve, Cc indicates a curve close to C2 as much as Tr from C1.

On the other hand, when the meta data indicating the presence of the appended image is not received, at operation 950 the display apparatus maintains the current TM settings, i.e. the DTM. In other words, Tr=100, and there are no changes in the TM curve.

Figure 10:
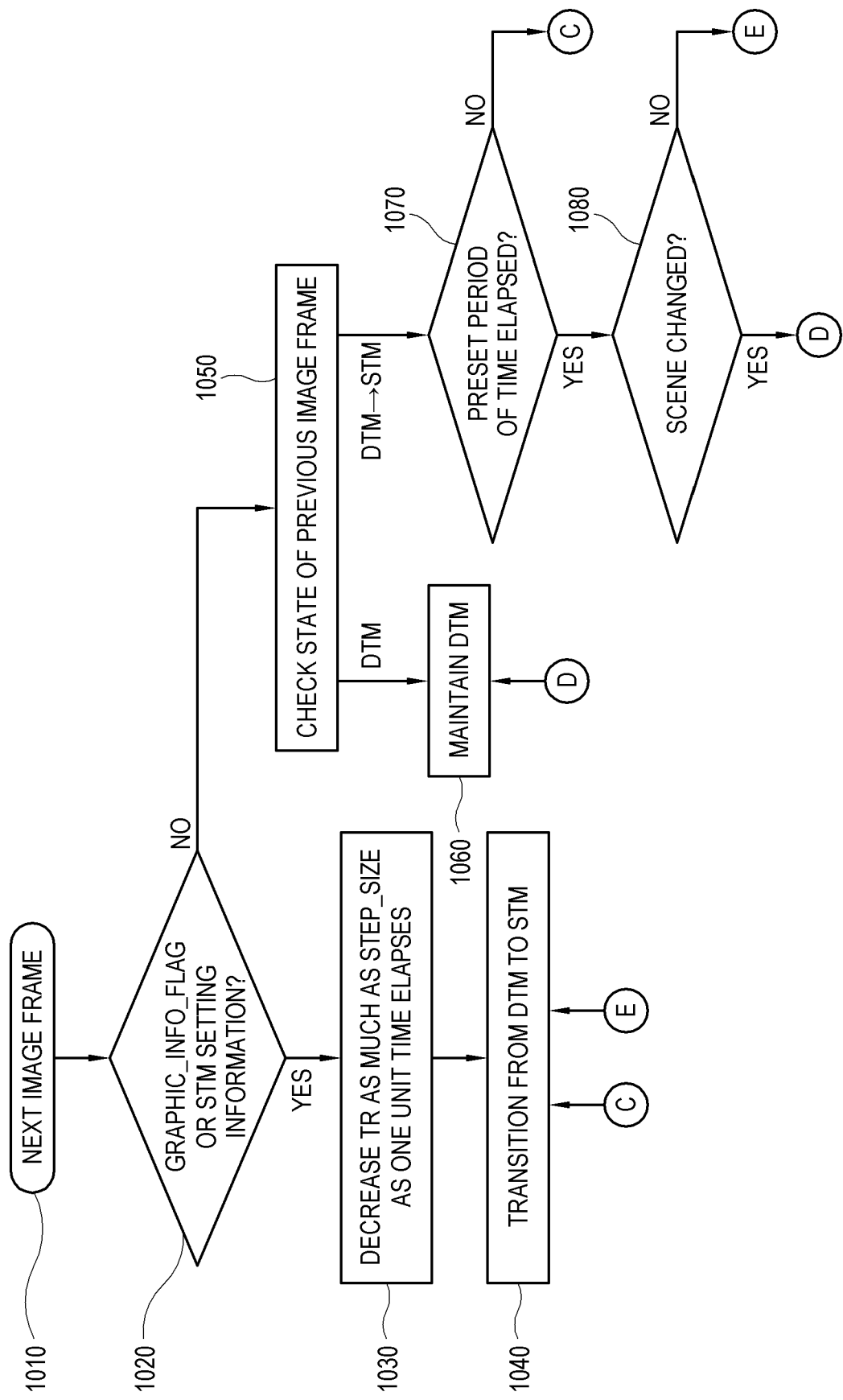
FIG. 10 is a flowchart showing operations of a display apparatus according to an embodiment of the disclosure after the second image frame during a procedure of switching the TM settings.

FIG. 10 is a flowchart showing operations of a display apparatus according to an embodiment of the disclosure after the second image frame during a procedure of switching the TM settings.

As shown in FIG. 10, at operation 1010 the display apparatus checks the next image frame. Here, the next image frame may be selected among the image frames subsequent to the first image frame of FIG. 9.

At operation 1020 the display apparatus determines whether meta data recorded with Graphic_info_flag=1 or meta data recorded with STM setting information is received from the content provider.

When the meta data indicating the presence of the appended image is received, at operation 1030 the display apparatus decreases the transition rate as much as step_size in response to progress of one unit time.

At operation 1040 the display apparatus transits the TM settings as much as the decreased transition rate.

On the other hand, when the meta data indicating the presence of the appended image is not received, at operation 1050 the display apparatus checks the TM settings of the previous image frame close in time to the image frame.

When the TM settings for the previous image frame are the DTM settings, at operation 1060 the display apparatus maintains the DTM settings.

On the other hand, when the previous image frame is in transition from the DTM to the STM, at operation 1070 the display apparatus determines whether a preset period of time elapses after the transition of the TM.

When the preset period of time does not elapse, the display apparatus directly enters the operation 1040. On the other hand, when the preset period of time elapses, at operation 1080 the display apparatus determines whether the scene is changed. When the scene is changed, the display apparatus enters the operation 1060. When the scene is not changed, the display apparatus enters the operation 1040. This is to prevent a user from noticeably recognizing change in image quality of the image due to the user's frequent inputs in the content provider or the display apparatus. In other words, during the transition of the TM settings under the condition that the DTM settings are applied, the transited TM settings are maintained for the foregoing preset period of time.

Figure 11:
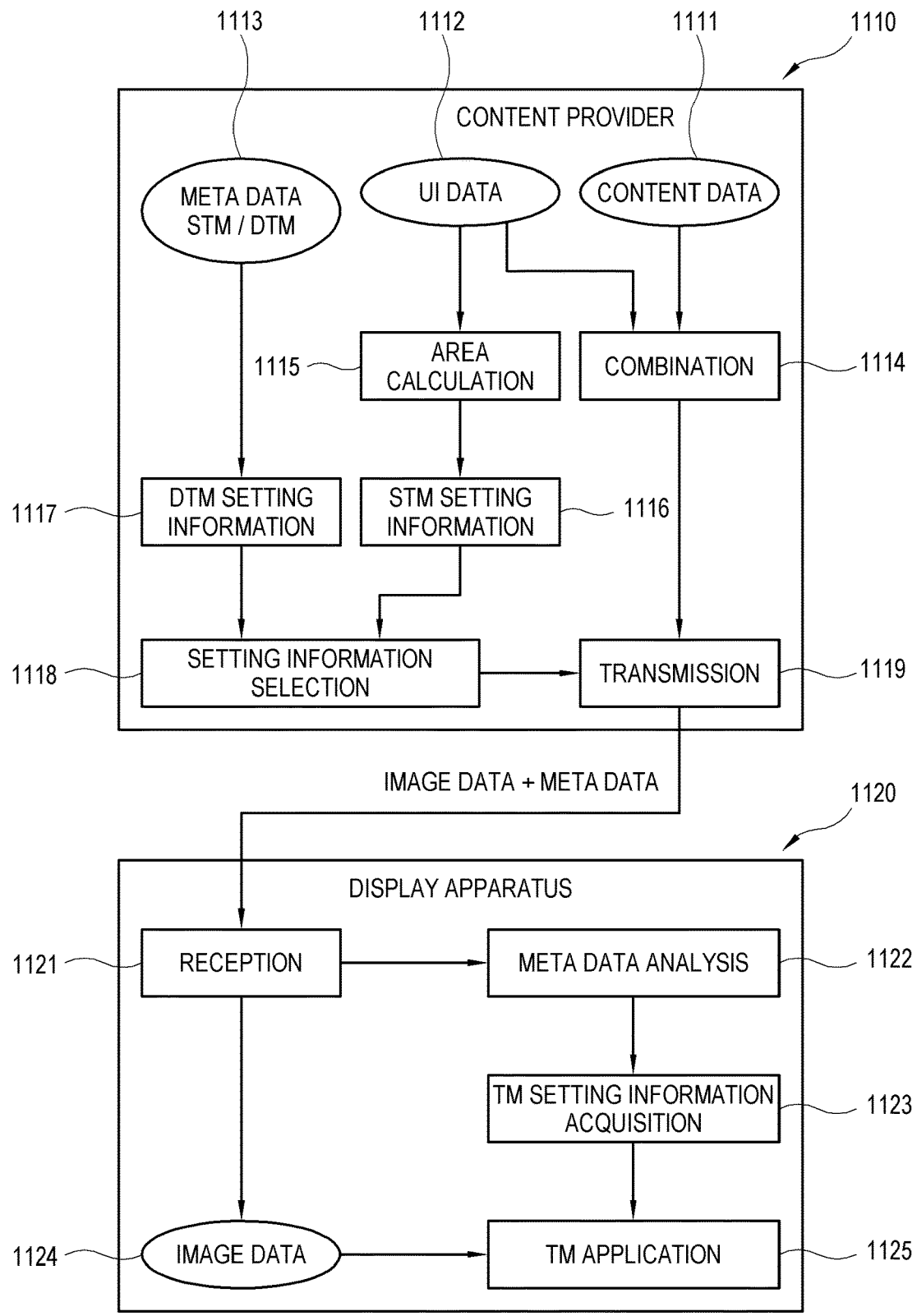
FIG. 11 is a block diagram showing another embodiment of data transmission and operation procedures of a content provider and a display apparatus of the disclosure.

FIG. 11 is a block diagram showing another embodiment of data transmission and operation procedures of a content provider and a display apparatus of the disclosure.

As shown in FIG. 11, a content provider 1110 combines content data 1111 and UI data 1112 to generate image data (1114). The content provider 1110 calculates the area of the UI with respect to the content image (1115), and generates STM setting information corresponding to a calculation result (1116). For example, the content provider 1110 may store the STM setting information corresponding to various combinations between the display apparatus and various reference monitors, and acquire certain setting information from the stored STM setting information.

Meanwhile, the content provider 1110 generates DTM setting information based on meta data 1113 of content data (1117).

The content provider 1110 selects setting information suitable for the current state between the DTM setting information and the STM setting information (1118). The content provider 1110 transmits the meta data recorded with setting information and the image data to the display apparatus 1120 (1119).

The display apparatus 1120 receives the image data and the meta data (1121), analyzes the meta data (1122), and obtains the TM setting information from the meta data (1123). The display apparatus 1120 applies the TM to the image data 1124 in accordance with the obtained TM setting information (1125).

In this embodiment, the DTM meta data settings defined in the standards are usable without conventional separate definition of meta data which is not defined in the HDMI standards. The content provider 1110 generates the TM setting information matching the current image frame, records the generated TM setting information in the meta data according to the formats of the DTM meta data standards, and transmits the meta data to the display apparatus 1120.

Figure 12:
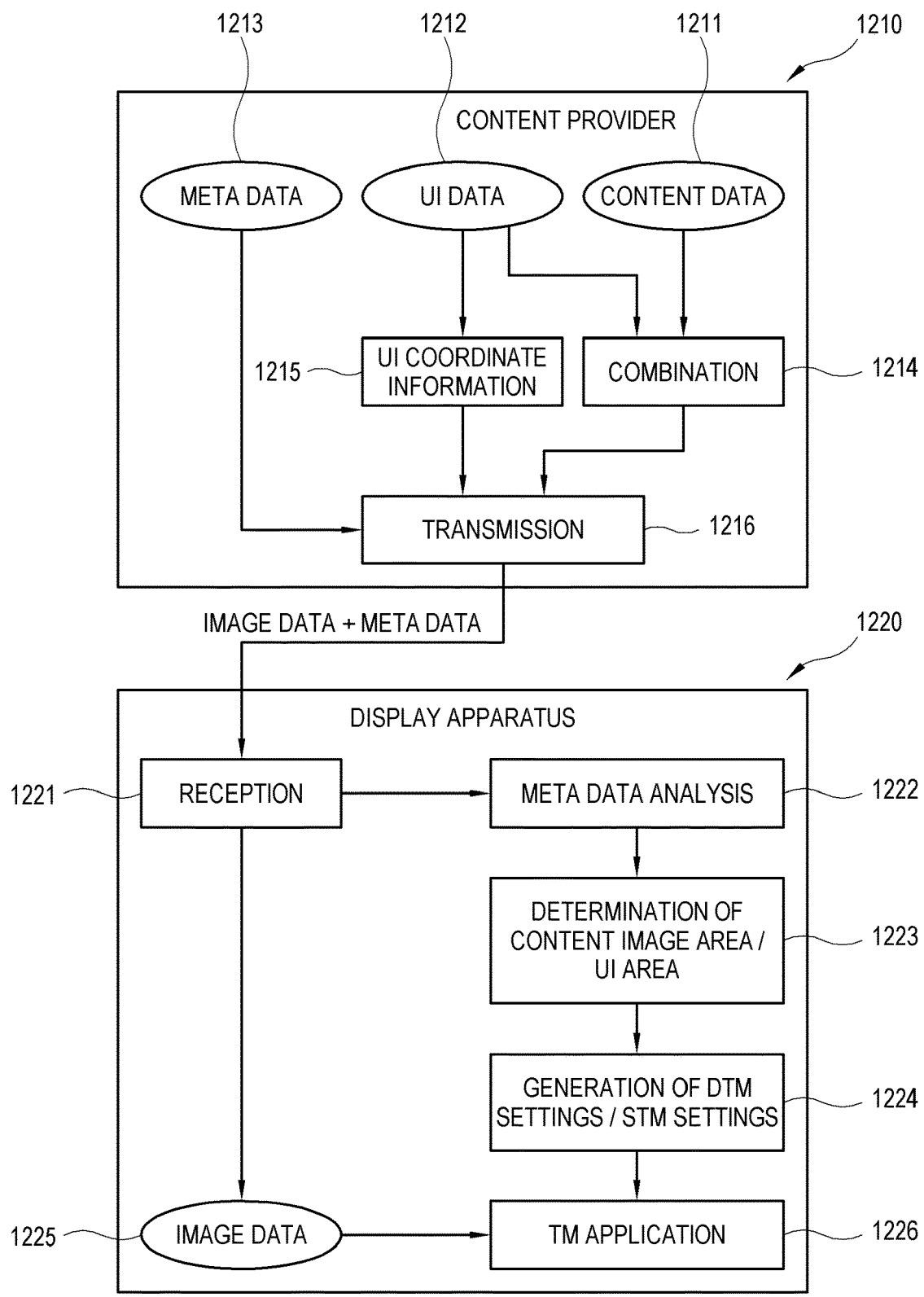
FIG. 12 is a block diagram showing another embodiment of data transmission and operation procedures of a content provider and a display apparatus of the disclosure.

FIG. 12 is a block diagram showing another embodiment of data transmission and operation procedures of a content provider and a display apparatus of the disclosure.

As shown in FIG. 12, a content provider 1210 in this embodiment distinguishes between a first area where a UI is displayed within an image frame when a content image is overlaid with the UI and a second area where only the content image is displayed without the UI, and provides information for distinguishing between the areas to a display apparatus 1220. The display apparatus 1220 distinguishes between the first area and the second area within the image frame based on the received information, and performs the TM by applying the STM settings to the first area and applying the DTM settings to the second area.

Detailed operations are as follows. The content provider 1210 combines UI data 1212 corresponding to the UI to be overlaid on the content image on the full screen with and content data 1211 corresponding to the content image to generate the image data (1214). The content provider 1210 determines coordinates of the UI on the full screen, and generates information about the coordinates of the UI (1215). For example, when the UI on the full screen is defined as a rectilinear area, the information about the coordinates of the UI is defined with four top-left, top-right, bottom-left and bottom-right coordinates corresponding to four vertices of the UI. The information about the coordinates of the UI may be used as reference information for applying the STM settings in the future, and additionally recorded in the meta data to be transmitted to the display apparatus 1220.

Further, the content provider 1210 analyzes the meta data 1213 to generate information for the DTM settings. The content provider 1210 transmits the meta data recorded with the foregoing information, together with the image data, to the display apparatus 1220 (1216).

The display apparatus 1220 receives the image data and the meta data (1221), and analyzes the meta data to thereby obtain the foregoing information (1222). The display apparatus 1220 determines an area occupied with the content image and an area occupied with the UI within the whole image based on the obtained information (1223), and generates the DTM setting information and the STM setting information (1224).

Ultimately, the display apparatus 1220 applies the TM to the image data 1225 (1226). With regard to the whole image, the display apparatus 1220 performs the DTM by applying the DTM setting information to the area occupied with the content image, and performs the STM by applying the STM setting information to the area occupied with the UI.

That is, the display apparatus in the foregoing embodiment selectively performs one TM of the DTM and the STM with respect to one image frame, but the display apparatus 1220 in this embodiment performs the TM different according to the respective areas based on the characteristics of the divided areas within one image frame. Thus, according to this embodiment, the TM optimized to each of the content image and the UI is individually performed to thereby improve the image quality of the whole image.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a ROM or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

The invention claimed is:

1. A display apparatus comprising:
a display;
a receiver configured to receive an image data of main content from a content provider; and
a processor configured to:
identify whether sub content is involved along with the main content in the image data received through the receiver,
in response to identifying that the sub content is not involved along with the main content, control the display to display an image of the image data which is processed by a dynamic tone mapping, and
in response to identifying that the sub content is involved along with the main content, control the display to display an image of the image data which is processed by a static tone mapping.

2. The display apparatus according to claim 1, wherein the processor is further configured to control the image to be displayed with brightness information, which is obtained matching pixel information of the image data, by one selected among a plurality of settings according to whether the sub content is involved in the image.

3. The display apparatus according to claim 1, wherein the processor is further configured to perform the image process based on an attribute of the display apparatus when the sub content is involved in the image, and perform the image process based on an attribute of the main content when the sub content is not involved in the image.

4. The display apparatus according to claim 3, wherein the processor is further configured to perform the image process based on the attribute of the main content by changing pixel information of the image data into brightness information of the image data in accordance with settings individually provided corresponding to scenes of the main content.

5. The display apparatus according to claim 3, wherein the processor is further configured to perform the image process based on the attribute of the display apparatus by changing pixel information of the image data into brightness information of the image data in accordance with a supportable brightness range of the display apparatus.

6. The display apparatus according to claim 1, wherein the processor is further configured to obtain the reference information from meta data that the content provider outputs.

7. The display apparatus according to claim 1, wherein it is determined that the sub content is involved in the image when an area ratio of the sub content to the image is greater than a threshold, and it is determined that the sub content is not involved in the image when the area ratio of the sub content to the image is not greater than the threshold.

8. The display apparatus according to claim 1, wherein the processor is further configured to:

perform a first image process based on an attribute of the display apparatus among the plurality of image processes when the image involves the sub content, maintain the first image process from a first point in time when from a second point in time when the image does not involve the sub content to a third point in time when the scene of the main content is changed, and perform a second image process based on an attribute of the main content among the plurality of image processes from the third point in time.

9. The display apparatus according to claim 1, wherein the processor is further configured to adjust an applying rate of a first image process and a second image process step by step as time elapses, when the first image process is switched over to the second image process among the plurality of image processes.

10. The display apparatus according to claim 1, wherein the processor is further configured to perform the image processes different according to an area where the sub content is displayed and an area where the sub content is not displayed within the image.

11. A method of controlling a display apparatus, comprising:

receiving an image data from a content provider;

identifying whether sub content is involved along with the main content in the received image data;

controlling, in response to identifying that the sub content is not involved along with the main content, the display to display an image of the image data which is processed by a dynamic tone mapping; and controlling, in response to identifying that the sub content is involved along with the main content, the display to display an image of the image data which is processed by a static tone mapping.

12. The method according to claim 11, further comprising displaying the image with brightness information, which is obtained matching pixel information of the image data, by one selected among a plurality of settings according to whether the sub content is involved in the image.

13. The method according to claim 11, further comprising:

performing the image process based on an attribute of the display apparatus when the sub content is involved in the image; and performing the image process based on an attribute of the main content when the sub content is not involved in the image.

14. The method according to claim 13, further comprising performing the image process based on the attribute of the main content by changing pixel information of the image data into brightness information of the image data in accordance with settings individually provided corresponding to scenes of the main content.

15. The method according to claim 13, further comprising performing the image process based on the attribute of the display apparatus by changing pixel information of the image data into brightness information of the image data in accordance with a supportable brightness range of the display apparatus.

16. A non-transitory computer readable medium storing instructions configured to cause a processor to perform the method of claim 11.

* * * * *